US008645963B2

(12) United States Patent
Gupta et al.

(10) Patent No.: US 8,645,963 B2
(45) Date of Patent: Feb. 4, 2014

(54) CLUSTERING THREADS BASED ON CONTENTION PATTERNS

(75) Inventors: Manish Gupta, New Delhi (IN); Anithra P. Janakiraman, TamilNadu (IN); Prashanth K. Nageshappa, Karnataka (IN); Srivatsa Vaddagiri, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/613,232

(22) Filed: Nov. 5, 2009

(65) Prior Publication Data

US 2011/0107340 A1 May 5, 2011

(51) Int. Cl.
*G06F 9/46* (2006.01)

(52) U.S. Cl.
USPC .......................................................... 718/102

(58) Field of Classification Search
None
See application file for complete search history.

(56) References Cited

U.S. PATENT DOCUMENTS

| 5,283,897 | A  | * | 2/1994 | Georgiadis et al. ........... 718/105 |
| 6,269,390 | B1 | * | 7/2001 | Boland .......................... 718/100 |
| 6,289,369 | B1 |   | 9/2001 | Sundaresan |
| 6,728,959 | B1 | * | 4/2004 | Merkey ......................... 718/102 |
| 6,938,252 | B2 |   | 8/2005 | Baylor et al. |
| 7,222,343 | B2 |   | 5/2007 | Heyrman et al. |
| 2002/0087736 | A1 | * | 7/2002 | Martin ........................ 709/312 |
| 2009/0125519 | A1 | * | 5/2009 | Robison et al. ................... 707/8 |
| 2010/0017804 | A1 |   | 1/2010 | Gupta et al. |

FOREIGN PATENT DOCUMENTS

| WO | WO 2007/128168 A1 |   | 11/2007 |
| WO | WO 2007128168 A1 | * | 11/2007 |

OTHER PUBLICATIONS

Rajagopalan et al. Thread Scheduling for Multi-Core Platforms.
Sridharan et al. Thread Migration to Improve Synchronization Performance.

* cited by examiner

*Primary Examiner* — Emerson Puente
*Assistant Examiner* — Sisley Kim
(74) *Attorney, Agent, or Firm* — Ryan, Mason & Lewis, LLP

(57) ABSTRACT

Techniques for grouping two or more threads based on lock contention information are provided. The techniques include determining lock contention information with respect to two or more threads, using the lock contention information with respect to the two or more threads to determine lock affinity between the two or more threads, using the lock affinity between the two or more threads to group the two or more threads into one or more thread clusters, and using the one or more thread clusters to perform scheduling of one or more threads.

15 Claims, 2 Drawing Sheets

CLUSTERING THREADS BASED ON CONTENTION PATTERNS

FIELD OF THE INVENTION

Embodiments of the invention generally relate to information technology, and, more particularly, to thread clustering.

BACKGROUND OF THE INVENTION

There is a strong architectural trend towards slowdown in processor clock frequency increase and use of multi-core systems, where improving performance from one generation to another relies primarily on increasing the degree of parallelism exploited by software rather than the increase in clock frequency of the underlying processor. Many multi-threaded applications, however, have problems with scalability on multi-cores due to issues such as synchronization and cache coherence. In highly threaded applications that extensively use threads that use locks to share data among them (such as, for example, Java applications), synchronization can become very expensive if the threads are distributed across various central processing units (CPUs) of the system. This can degrade the performance of these applications significantly, especially on a system with a large number of cores.

The scheduling of threads to the processors can be performed by an operating system (OS) based on the current workload and various factors such as, for example, affinity of a thread to the CPU where it had run previously. There is a possibility that threads that contend for the same locks (and that share the same data) will be assigned to different processors by the scheduler, and therefore one would have multiple copies of the data which will have to be synchronized to maintain cache coherence.

SUMMARY OF THE INVENTION

Principles and embodiments of the invention provide techniques for clustering threads based on contention patterns. An exemplary method (which may be computer-implemented) for grouping two or more threads based on lock contention information, according to one aspect of the invention, can include steps of determining lock contention information with respect to two or more threads, using the lock contention information with respect to the two or more threads to determine lock affinity between the two or more threads, using the lock affinity between the two or more threads to group the two or more threads into one or more thread clusters, and using the one or more thread clusters to perform scheduling of one or more threads.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
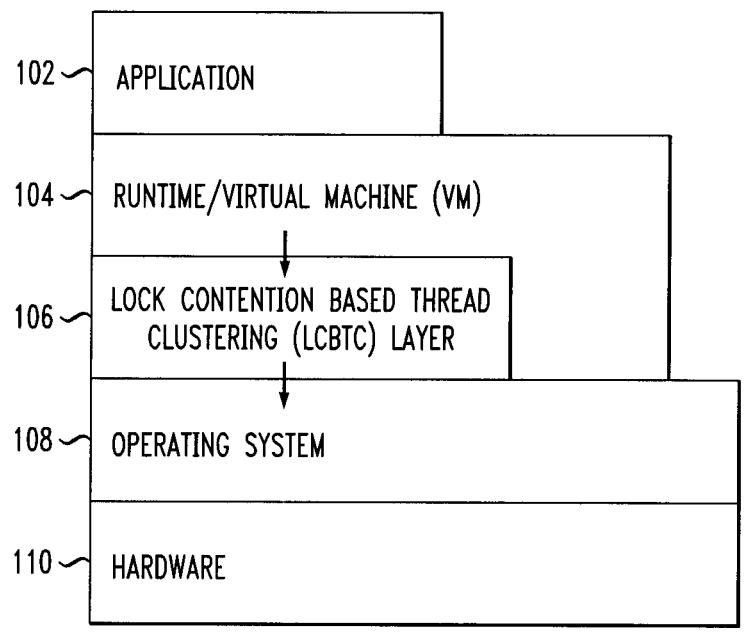
FIG. 1 is a block diagram illustrating an exemplary embodiment of clustering threads based on contention patterns, according to an aspect of the invention.

Principles of the invention include thread clustering based on lock contention. One or more embodiments of the invention include providing a mechanism to specify affinity between different threads. As detailed herein, synchronization costs are reduced when threads contending for the same locks are grouped so that a scheduler can use this information to schedule the related threads (for example, onto the same core or nearby cores that share a cache). As such, one or more embodiments of the invention include determining lock affinity between threads based on lock contention pattern, and using such information to group threads and schedule them on the same or nearby processors and/or cores to take advantage of the data already residing in the associated cache and to reduce synchronization costs. Further, as described herein, lock contention patterns can be determined by a run-time thread library that provides lock application programming interfaces (APIs) or a Virtual Machine (VM) such as, for example, a Java Virtual Machine, which manages its locks and threads.

As noted above, one or more embodiments of the invention include determining lock affinity between threads (for example, interims of common data on which the threads work in a short span of time, etc.). The techniques detailed herein do not require any information from the application. The lock contention patterns can be determined, for example, by the VM itself. This information is gathered and collated, for example, by what is referred to herein as the lock contention based thread clustering (LCBTC) layer. The LCBTC layer also executes a clustering algorithm periodically to determine the different thread clusters based on lock affinity. The cluster information can be passed to the operating system (OS) that uses this information to schedule the threads accordingly.

Cache coherency traffic is an inhibitor to scaling multi-threaded applications in existing approaches. One or more embodiments of the invention, in contrast, greatly reduce the problem. Existing approaches require either changes to the application or extensive profiling at the OS level. The techniques detailed herein can be used, for example, with all existing applications, and the run-time or VM need not be aware of the underlying architecture.

In one or more embodiments of the invention, the affinity information is used only to influence the scheduling, and it is not binding. As such, the OS can continue to use known thread scheduling techniques for load balancing. The chances of a cache-hit for data commonly accessed by threads with lock affinity are increased, leading to performance improvements.

In multi-threaded programming, it is common to use locks to protect shared data. Whenever a thread (for example, Thread-A) wants to access (that is, read or write) a shared data, it acquires the lock. Once the thread is done accessing the shared data, it releases the lock. While one thread has acquired a lock (and not released it yet), if another thread (for example, Thread-B) comes to acquire the same lock, the lock is said to be contended for. Thread-B needs to wait (that is, spin or block or undispatch) until Thread-A is done with accessing the shared data and the lock is released.

Additionally, synchronization across cores on a multi-core system can be more difficult than synchronization on the same processor. It is also possible that threads contending for one lock will do so multiple times. As such, one or more embodiments of the invention include using the history information pertaining to lock contentions to determine the lock affinity between different threads with the idea of scheduling threads with high lock affinity on the same or nearby cores and/or processors. Further, in one or more embodiments of the invention, the following algorithm, by way of example, can be implemented.

Step 1: If Thread-A holds a lock on an object, and Thread-B wishes to access the same object, a message is sent to the LCBTC layer using an LCBTC application programming interface (API). The message can be of the form:

addcontentioninfo(Owner_TID, Contd_TID, Object_ID)

where:

Owner_TID=Thread that is holding lock
Contd_TID=Thread that is contending for the same lock
Object_ID=Object that is protected by the lock Step 2: The LCBTC layer collates this information in a hashtable which maintains the number of contentions that occur between every pair of running threads. A number, which is the lesser of Owner_TID and Contd_TID, is used to index into the hash table. For example, if Owner_TID=1000, and Contd_TID=2000, number 1000 is used to index into the hash table. Each node in the hash table represents a pair of threads that have contended for one or more locks and has the following information:

```
struct hash_node_structure {
        int LID;//lower of the id's of either contended or
        owner thread
        int GID;// greater of the ids of either
contended or owner thread
        int OldCount;//used for ageing
        int NewCount;//present contention count
irrespective of the monitor involved
        struct hash_node_structure *HNS_next;
};
```

Whenever addcontentioninfo( ) is called, it searches for a node in the hashtable that represent the two threads. If no node is found, it allocates one. Otherwise, it updates the NewCount field by +1.

Step 3: Periodically, a thread scans the hashtable and uses the lock contention information to create thread clusters. Clusters can be formed, for example, using various existing algorithms (for instance, using a k-means clustering technique). To ensure that the thread group information is always current, the thread also decays the contention count between every pair of threads that is found in the hash table.

Step 4: The cluster information is passed to the OS, which can use this information to influence scheduling. This also provides an opportunity for other unrelated threads to be scheduled onto other processors and/or cores and all threads requiring the same contended lock to be scheduled on the same processor/core. This increases the likelihood of cache hits for a thread and allows it to complete its job with the shared data faster and, hence, achieve better overall performance.

In production environments running applications such as, for example, the WebSphere Application Server, there are threads whose life spans many hours. In such instances, it would be advantageous to determine contention information early in the process. Also, in one or more embodiments of the invention, it can be safely assumed that threads that contend highly will also access other shared data, making it even more advantageous that these threads be scheduled together. Additionally, in one or more embodiments of the invention, the decision is based on what data is needed by a group of threads in the near future rather than the number of times a thread requests access to the cache memory (through hardware counters) associated with a processor.

Various alternatives can be used in one or more embodiments of the invention for clustering threads based on contention information. Such alternatives can include, by way of example, the following. For instance, only after a minimum of N contentions between two threads will they be considered while forming thread clusters. Also, for example, threads can be considered for forming clusters only if contention occurs on locks which are held for a longer period of time. Further, by way of example, threads can be considered for forming clusters only if contention occurs on locks which are used to control huge amounts of data.

As detailed herein, one or more embodiments of the invention include making a decision to group threads based on contention patterns and involving contentions over more than one lock. Unlike disadvantageous existing approaches, the techniques described herein determine a calculated decision based on contention history with an aim of uncovering locking patterns of threads. The groups are determined based on these patterns, and the threads are scheduled together on the same or nearby cores so that when they contend for a lock, they are already running on the same or nearby processor core. Further, such techniques are not affected by any single contended lock.

FIG. 1 is a block diagram illustrating an exemplary embodiment, according to an aspect of the invention. By way of illustration, FIG. 1 depicts an application module 102, a run-time or virtual machine (VM) module 104, an LCBTC layer module 106 (which can, for example, be a part of the run-time or VM module), an operating system module 108 and a hardware module 110.

The run-time or VM module 104 performs the actions detailed in Step 1 above (that is, sending a message to the LCBTC layer using an LCBTC API). The LCBTC layer module 106 performs the actions detailed in Step 2 and Step 3 above (that is, collating lock contention information in a hashtable that maintains the number of contentions that occur between every pair of running threads, and scanning the hashtable and using the lock contention information to create thread clusters). Additionally, the OS module 108 performs the actions detailed in Step 4 above (that is, using cluster information to influence scheduling).

Figure 2:
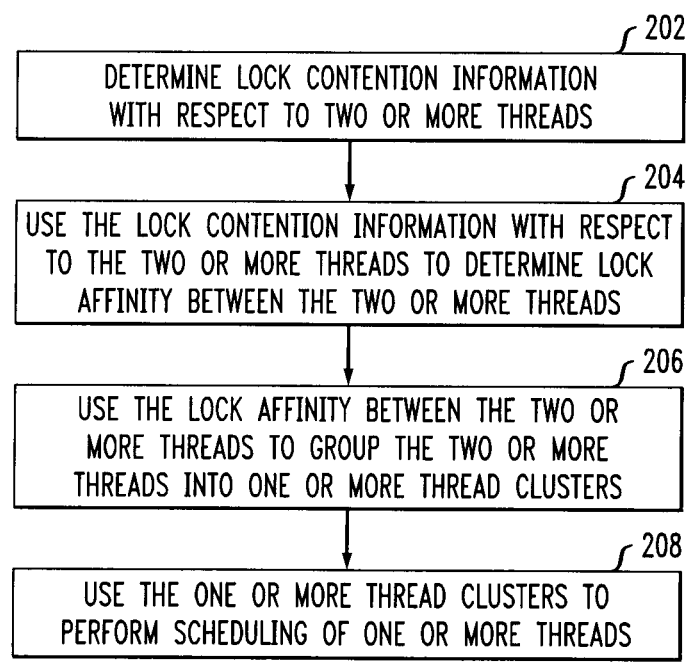
FIG. 2 is a flow diagram illustrating techniques for grouping two or more threads based on lock contention information, according to an embodiment of the invention.

FIG. 2 is a flow diagram illustrating techniques for grouping two or more threads based on lock contention information, according to an embodiment of the present invention. Step 202 includes determining lock contention information with respect to two or more threads. Determining lock contention information with respect to two or more threads can include, for example, sending a message to the LCBTC layer using a LCBTC application programming interface (API) to relay lock contention information about one or more threads.

Step 204 includes using the lock contention information with respect to the two or more threads to determine lock affinity between the two or more threads. Using the lock contention information to determine lock affinity between the threads can include determining affinity based on one or more lock contention patterns. Also, using the lock contention information to determine lock affinity between the threads can include using the LCBTC layer to collate the lock contention information in a hashtable, wherein the hashtable maintains a number of contentions that occur between every pair of running threads that contended on a lock at least once. Each node in the hashtable can represent a pair of threads that have contended for one or more locks.

Step 206 includes using the lock affinity between the two or more threads to group the two or more threads into one or more thread clusters. Using the lock affinity to group the threads into thread clusters can include a thread scanning a hashtable (as described herein) and using the lock contention information to create thread clusters. Additionally, one or more embodiments of the invention include decaying the contention count between every pair of threads that is found in a hashtable to ensure that thread cluster information is current.

Further, using the lock affinity between threads to group the threads into thread clusters can include, for example, forming a thread cluster only after a minimum of N contentions between two threads, forming a cluster only if contention occurs on one or more locks that are held for a pre-determined period of time (for example, a period of time set by a user), and/or forming a cluster only if contention occurs on one or more locks that are used to control a pre-determined amount of data (for example, an amount of data set by a user).

Step 208 includes using the one or more thread clusters to perform scheduling of one or more threads (for example, of the same cluster on the same or neighboring processor core). Using the thread clusters to perform scheduling of threads can include, for example, passing information regarding the thread clusters to an operating system (OS), wherein the operating system uses the information to influence scheduling. Further, one or more embodiments of the invention can include scheduling other unrelated threads onto other processors and/or cores, as well as scheduling one or more threads requiring a same contended lock on the same processor or core. Unrelated threads, as noted herein, are threads that do not belong to any cluster or belong to the default cluster.

The techniques depicted in FIG. 2 can also, as described herein, include providing a system, wherein the system includes distinct software modules, each of the distinct software modules being embodied on a tangible computer-readable recordable storage medium. The one or more distinct software modules can include, for example, an application module, a lock contention based thread clustering (LCBTC) layer module, a run-time or virtual machine (VM) module and an operating system module executing on a hardware processor. In one or more embodiments of the invention, the LCBTC layer module may or may not be part of the run-time or VM module.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
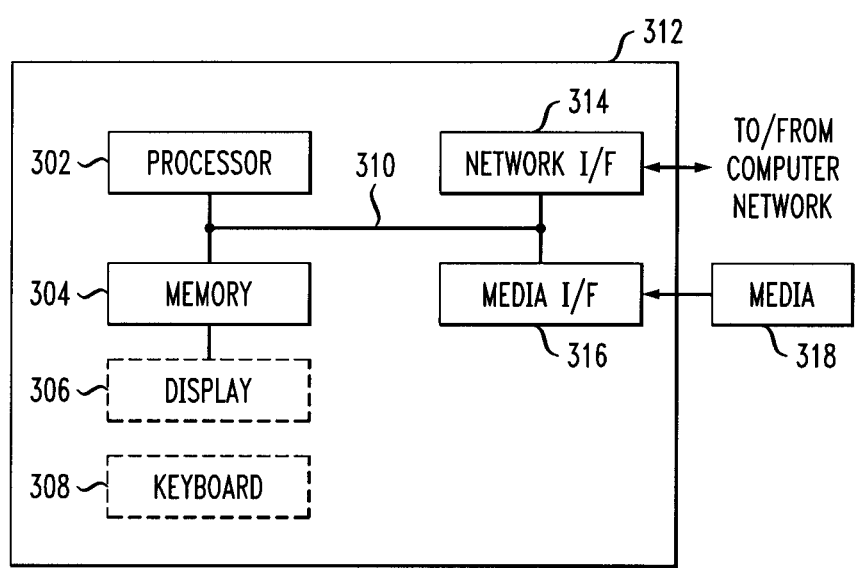
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, determining lock affinity between threads based on lock contention pattern, and using such information to group threads and schedule them on the same or nearby processors.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for grouping two or more threads based on lock contention information, wherein the method comprises:
    determining lock contention information at run-time with respect to two or more running threads;
    using the lock contention information with respect to the two or more threads to determine lock affinity between the two or more threads by collating the lock contention information in a data structure that maintains a number of contentions that occur between every pair of running threads that contended on a lock at least once;
    using the lock affinity between the two or more threads to group the two or more threads into one or more thread clusters by scanning the data structure to form a thread cluster of the two or more threads only after a pre-determined minimum number of contentions between the two or more threads, wherein the pre-determined minimum number of contentions is two or more;
    decaying the contention count between each pair of threads in the data structure to determine current thread cluster information; and
    using the one or more thread clusters to perform scheduling of the grouped two or more threads on a same processor.

2. The method of claim 1, wherein determining lock contention information with respect to two or more threads comprises sending a message to a lock contention based thread clustering (LCBTC) layer using an LCBTC application programming interface (API) to relay lock contention information about one or more threads.

3. The method of claim 1, wherein using the lock contention information with respect to the two or more threads to determine lock affinity between the two or more threads comprises determining affinity based on one or more lock contention patterns.

4. The method of claim 1, wherein using the one or more thread clusters to perform scheduling of one or more threads comprises passing information regarding the one or more thread clusters to an operating system (OS), wherein the operating system uses the information to influence scheduling.

5. The method of claim 4, further comprising scheduling one or more other unrelated threads onto at least one of one or more other processors and one or more other cores.

6. The method of claim 4, further comprising scheduling one or more threads requiring a same contended lock onto a same processor or core.

7. The method of claim 1, using the lock affinity between the two or more threads to group the two or more threads into one or more thread clusters further comprises:
    forming a cluster only if contention occurs on one or more locks that are held for a pre-determined period of time; and
    forming a cluster only if contention occurs on one or more locks that are used to control a pre-determined amount of data.

8. The method of claim 1, further comprising providing a system, wherein the system comprises one or more distinct software modules, each of the one or more distinct software modules being embodied on a tangible computer-readable recordable storage medium, and wherein the one or more distinct software modules comprise an application module, a lock contention based thread clustering (LCBTC) layer module, a run-time or virtual machine (VM) module and an operating system module executing on a hardware processor.

9. A computer program product comprising a non-transitory tangible computer readable recordable storage medium including computer useable program code for grouping two or more threads based on lock contention information, the computer program product including:
    computer useable program code for determining lock contention information at run-time with respect to two or more running threads;
    computer useable program code for using the lock contention information with respect to the two or more threads to determine lock affinity between the two or more threads by collating the lock contention information in a data structure that maintains a number of contentions that occur between every pair of running threads that contended on a lock at least once;

computer useable program code for using the lock affinity between the two or more threads to group the two or more threads into one or more thread clusters by scanning the data structure to form a thread cluster of the two or more threads only after a pre-determined minimum number of contentions between the two or more threads, wherein the pre-determined minimum number of contentions is two or more;

computer useable program code for decaying the contention count between each pair of threads in the data structure to determine current thread cluster information; and computer useable program code for using the one or more thread clusters to perform scheduling of the grouped two or more threads on a same processor.

10. The computer program product of claim 9, wherein the computer useable program code for determining lock contention information with respect to two or more threads comprises computer useable program code for sending a message to a lock contention based thread clustering (LCBTC) layer using an LCBTC application programming interface (API) to relay lock contention information about one or more threads.

11. The computer program product of claim 9, wherein the computer useable program code for using the one or more thread clusters to perform scheduling of one or more threads comprises computer useable program code for passing information regarding the one or more thread clusters to an operating system (OS), wherein the operating system uses the information to influence scheduling.

12. The computer program product of claim 9, wherein the computer useable program code comprises one or more distinct software modules, and wherein the one or more distinct software modules comprise an application module, a lock contention based thread clustering (LCBTC) layer module, a run-time or virtual machine (VM) module and an operating system module executing on a hardware processor.

13. A system for grouping two or more threads based on lock contention information, comprising:

a memory; and at least one processor coupled to the memory and operative to:
  determine lock contention information at run-time with respect to two or more running threads;
  use the lock contention information with respect to the two or more threads to determine lock affinity between the two or more threads by collating the lock contention information in a data structure that maintains a number of contentions that occur between every pair of running threads that contended on a lock at least once;
  use the lock affinity between the two or more threads to group the two or more threads into one or more thread clusters by scanning the data structure to form a thread cluster of the two or more threads only after a pre-determined minimum number of contentions between the two or more threads, wherein the pre-determined minimum number of contentions is two or more;
  decay the contention count between each pair of threads in the data structure to determine current thread cluster information; and
  use the one or more thread clusters to perform scheduling of the grouped two or more threads on a same processor.

14. The system of claim 13, wherein the at least one processor coupled to the memory operative to determine lock contention information with respect to two or more threads is further operative to send a message to a lock contention based thread clustering (LCBTC) layer using an LCBTC application programming interface (API) to relay lock contention information about one or more threads.

15. The system of claim 13, further comprising a tangible computer-readable recordable storage medium having one or more distinct software modules embodied thereon, wherein the one or more distinct software modules comprise an application module, a lock contention based thread clustering (LCBTC) layer module, a run-time or virtual machine (VM) module and an operating system module executing on a hardware processor.

* * * * *